April 14, 1959 A. U. BRYANT 2,882,010
FLOW CONTROL VALVE
Filed Jan. 19, 1953 2 Sheets-Sheet 1
FIG_1_
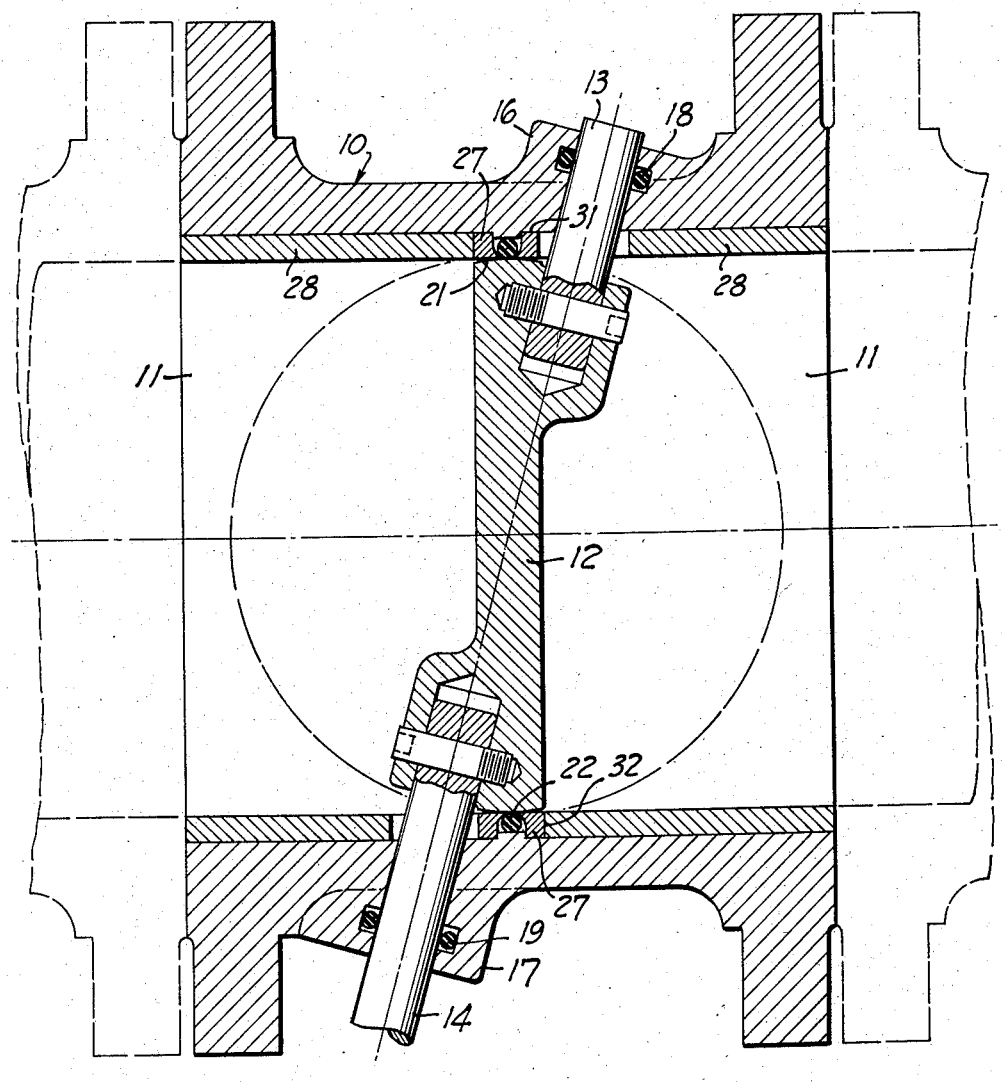
INVENTOR.
Austin U. Bryant
BY
ATTORNEYS April 14, 1959   A. U. BRYANT   2,882,010
FLOW CONTROL VALVE
Filed Jan. 19, 1953   2 Sheets-Sheet 2
FIG_2_
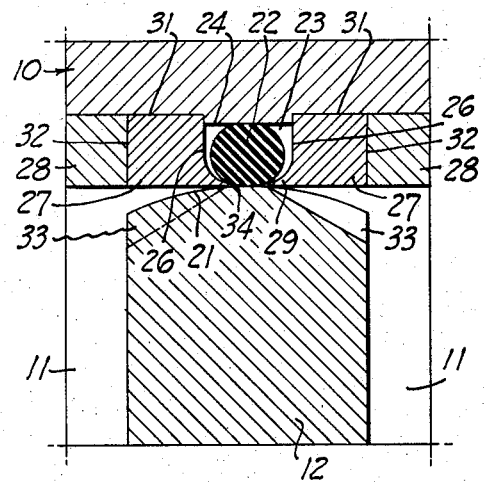
FIG_3_
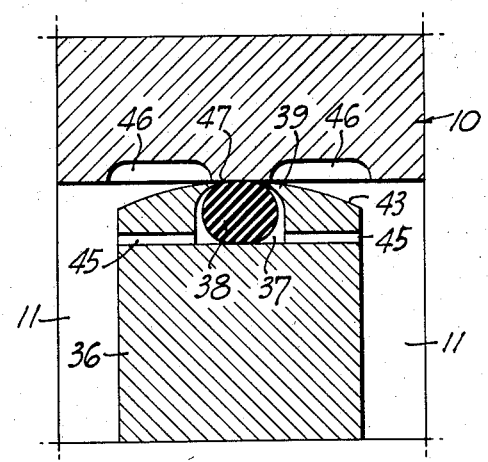
FIG_4_
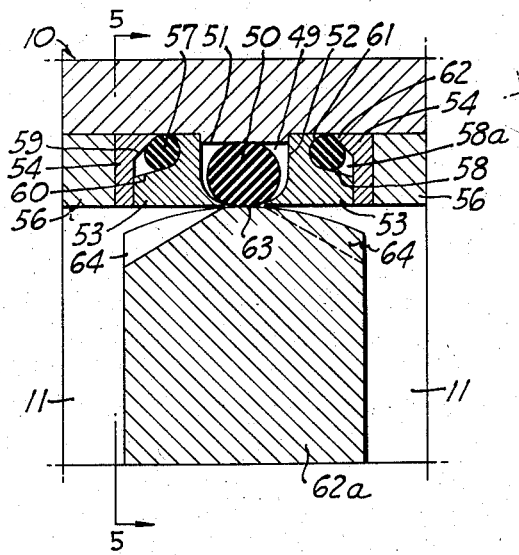
FIG_5_
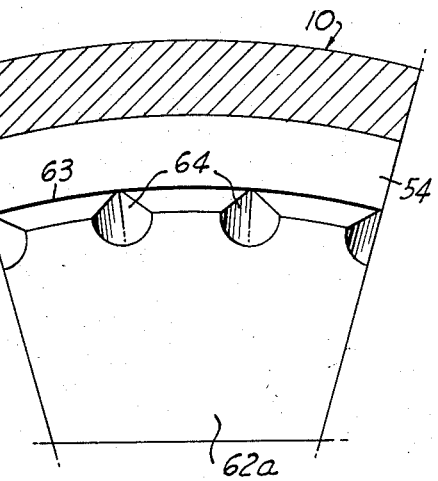
INVENTOR.
Austin U. Bryant
BY
ATTORNEYS United States Patent Office 2,882,010
Patented Apr. 14, 1959

2,882,010

FLOW CONTROL VALVE

Austin U. Bryant, Walnut Creek, Calif., assignor, by mesne assignments, to Walworth Company, New York, N.Y., a corporation of Massachusetts Application January 19, 1953, Serial No. 331,837

5 Claims. (Cl. 251—306)

This invention relates generally to valves for controlling fluid flow, and particularly to valves of the "butterfly" type.

Valves of the butterfly type make use of a valve closure in the form of a disc, which has a valve working surface on its outer periphery. The body has a straight through passage, and at some point intermediate the ends of the passage, it is formed to provide a circularly contoured valve working surface which cooperates with the valve working surface of the valve member. The valve member is mounted to turn upon an axis which extends generally laterally of the body. Turning of the valve member moves it from full open to closed positions, the plane of the valve member being coincident with the axis of the passage for full open position, and at right angles to the passage for closed position. In some instances the turning axis is parallel to the plane of the valve member, while in other instances the axis is at an acute angle to the plane of the valve member, whereby the valve member must be turned somewhat more than 90° to move it between full open and closed positions.

Conventional butterfly valves do not provide fluid tight shutoff. This is because no means is provided for pressing the valve working surfaces into tight engagement, as with other types of conventional valves, such as valves of the globe type. Even with highly accurate machining of the valve working surfaces, it is difficult if not impossible to maintain them in such juxtaposition as to avoid a substantial amount of leakage. Some effort has been made to improve the shutoff by the use of soft seating materials like resilient rubber. Many of such constructions have not been as satisfactory as desired chiefly because of cold flow of the rubber, and because the difficulty of maintaining such surfaces in sealing contact increases with an increase in operating pressure. Sealing means of the resilient O-ring type have been used for the lower operating pressures, but have been subject to O-ring dislodgement for the higher operating pressures (e.g. 300 to 600 p.s.i. and higher).

In general it is an object of the present invention to provide a butterfly type of valve which secures effective fluid tight seal for closed position, and which will not be subject to the disadvantages of prior conventional butterfly valves making use of resilient seating materials.

Another object of the invention is to provide a butterfly valve which can be used with relatively high operative pressures.

Additional object and features of the invention will appear from a following description in which the preferred embodiments have been set forth in detail in conjunction with the accompanying drawings.

Referring to the drawings:

Figure 1 is a side elevational view in section illustrating a butterfly valve incorporating the present invention.

Figure 2 is an enlarged cross-sectional detail illustrating the mounting means for the seal ring of the O-ring type.

Figure 3 is an enlarged cross-sectional detail like Figure 2, but showing another embodiment of the invention.

Figure 4 is a detail like Figure 2 but showing another embodiment.

Figure 5 is a detail in section illustrating the construction of the valve member incorporated in Figure 4.

The valve illustrated in Figure 1 consists of a body 10 having a passage 11 extending through the same. The ends of the body may be flanged or otherwise formed for connection with associated piping. A valve member 12 is substantially in the form of a disc, and is mounted upon the aligned shaft sections 13 and 14. These shaft sections are journaled within the body portions 16 and 17. Suitable means such as the resilient O-rings 18 and 19 can be provided to prevent leakage past the shaft sections.

The annular periphery 21 of the valve member 12 is machined to form a valve working surface, and this surface is shaped whereby in a section it conforms to a circle having a radius extended from the center of the valve member. The angle between the plane of the valve member 12 and the axis of the shaft sections 13 and 14 is such that the valve working surface 21 is continuous, and whereby the shaft sections must be turned through an angle somewhat greater than 90°, as for example 135°, to move it from the full closed position shown in Figure 1, to the full open position in which its plane is coincident with the axis of the passage 11. One of the shaft sections, as for example, section 14, can be attached to suitable operating means, such as a hand wheel, motor driven means, etc.

The stationary seating means which cooperates with the valve member consists of a resilient O-ring 22 which can be formed of suitable material such as a synthetic rubber like Hycar or neoprene. This O-ring is accommodated with a retaining recess or groove 23, which is defined by the peripheral surface 24 formed on the body, and the opposed surfaces 26 formed on the retaining rings 27. The rings 27 in turn are held in place by suitable means such as the sleeves 28, which can extend to the ends of the body.

Preferably the surfaces 26 are formed whereby in section, as illustrated in Figure 2, lips 29 are provided which extend in retaining relationship with respect to the inner periphery of the O-ring 22. When the valve is in closed position as illustrated in Figure 2, the dimensioning is such that the O-ring 22 is compressed somewhat in a radial direction, between the surfaces 21 and 24. This serves to establish sealing relationship between the valve member and the body. The normal dimensioning of the O-ring is such that the diameter of its section is substantially greater than the annular gap between the lips 29. However this gap is sufficient for the O-ring to establish sealing contact with the surface 21.

The machining and fitting between the parts is such that the outer corners of the recess 23, on opposite sides of the O-ring, are in fluid communication with the corresponding sides of the passage 11. This communication is by way of the clearance between the outer periphery of each ring 27 and the body, indicated at 31, and the clearance between the adjacent spaces of each ring 27 and the corresponding sleeve 28, as indicated at 32.

As shown particularly in Figure 2, the opposite sides of the valve member are provided with circumferentially spaced grooves 33. These grooves extend from the relatively narrow working surface 34, which is left uninterrupted for effective fluid tight sealing engagement with the O-ring 22. It will be noted that these grooves are tapered with the smallest end of each groove nearest to the surface 34.

Operation of the embodiment described above is as follows: For the closed position of the valve shown in Figures 1 and 2, the resilient O-ring establishes a bubble tight seal between the body and valve members. The O-ring is held against dislodgment from its accommodating recess by the lips 20, and by virtue of the fact that the inner corners of the recess 23 are vented to the sides of the valve members. In closed position, fluid pressure can be applied to either side of the valve member without fluid leakage. As one commences to turn the valve member toward open position, substantially one-half of the periphery of the valve member moves toward the downstream side and the other half of the periphery advances toward the upstream side of the valve. As sealing contact between surface 34 and the O-ring 22 is broken, the fluid flow first commences to flow through grooves 33, and thereafter greater flow is established as opening movement continues.

As the fluid pressure applied to the valve is increased, there is an increasing tendency for fluid pressure and flow to dislodge the O-ring from its accommodating recess, particularly as the seal with the O-ring is initially being broken, or as the valve member is completing its movement toward final closed position. A number of features of my valve contribute to retension of the O-ring under such conditions. The lips 29 serve to mechanically retain the O-ring and make it necessary for the O-ring to be greatly compressed before it can be dislodged from its accommodating recess. The venting of the bottom corners of the recess to the line makes it impossible for fluid pressure to be trapped within the accommodating recess, and which is not vented off would tend to dislodge the O-ring. The flow established through the grooves 33 for positions of the valve member near completely closed position, tend to equalize the pressure differential between the upstream and downstream sides of the valve, thus minimizing differential fluid forces tending to act upon the O-ring to dislodge it from its accommodating recess. In other words, assuming that the valve is closed with pressure applied to the upstream side, initial flow through the grooves 33 as one commences to move the valve member toward open position, tends to equalize the pressure between the upstream and the downstream sides before the peripheral surface 21 of the valve member is completely saparated from the O-ring.

Figure 3 illustrates another embodying of the invention. In this instance the O-ring is carried by the valve member, rather than the body. Circumferentially spaced grooves 46 are formed in the valve member on opposite sides of the relatively narrow valve working surface 47. With such grooves, initial movement of the valve member toward open position first establishes a flow between the inlet and outlet sides of the passage through the grooves 46, and thereafter greater flow is established as the O-ring progresses away from contact with the body. The resilient O-ring 38 in this instance is accommodated within the recess 37 formed in the valve member 36. The lips 39 are disposed to retain the O-ring within its recess. One or more ducts 45 establish pressure equalizing communication between the corners of the recess 37 and the two sides of the valve member. The grooves 46 in Figure 3 serve substantially the same purpose as the grooves 33 of Figure 2.

Figures 4 and 5 illustrate another embodiment of the invention in which the O-ring is carried by the body, and grooves are provided in the valve member. In this instance the accommodating recess 49 for the resilient O-ring 50 is defined by the peripheral surface 51 of the body, and a surface 52, formed on the rigid rings 53. Additional metal rings 54 cooperate with rings 53, and each of the assemblies formed by these rings is retained in place by an associated sleeve 56. In addition to the O-ring 50 I provide the two supplemental O-rings 57, which are within the accommodating recesses 58. Each recess 58 is formed in part by the convergent surfaces 59 and 60, and is extended between these surfaces as indicated at 58a. Normally each O-ring 57 is deformed in a radial direction, whereby it establishes seating contact between the body and the associated ring 53. Contact with the body is established through the spaced lips 61 and 62. When a pressure differential is applied to one ring 57 from the space on the corresponding side of the valve member, or in other words in a direction tending to cause fluid to flow into the recess 49, the O-ring 57 establishes a tight seal to prevent such fluid communication. However, when a pressure differential is applied in the reverse direction, the O-ring 57 tends to be squeezed into the recess extension 58a, and be retracted from sealing contact with the body, whereby some fluid flow may occur from the recess 49 past the O-ring 57, and through the clearances between rings 53 and 54 and the body, and between ring 54 and the sleeve 56.

The valve member 62a in Figure 4 has a peripheral surface 63 which establishes contact with the O-ring 50. It is also shown provided with the circumferentially spaced grooves 64, which are divergent toward the side faces of the valve member and circumferentially spaced as illustrated in Figure 5.

Operation of the valve as illustrated in Figures 4 and 5 is as follows: For full closed position of the valve member the parts are as illustrated in Figure 4, and the O-ring 50 establishes a seal between the surfaces 51 and 63. When one commences to turn the valve member toward open position with pressure applied to one side of the valve, initial breaking of the seal between the valve member and the O-ring, results in some fluid being admitted into the recess 49. Particularly for that part of the valve member which is advancing toward the upstream side of the valve, this creates a condition tending to urge the exposed portion of the O-ring from its accommodating recess. However such tendency is reduced by virtue of the fact that the fluid thus admitted to the recess 49 can escape past the downstream O-ring 57.

A valve constructed in accordance with Figures 4 and 5 is likewise a two-way device, and therefore it operates equally well irrespective of the side to which high pressure is applied. Such a valve is operable on line pressures somewhat higher than can be used with the previous embodiments, because the outer portions of the O-ring recess 49 are vented to the downstream side for flow in either direction without receiving flow from the upstream side through the venting means.

In general a butterfly valve constructed in accordance with the present invention is a marked improvement over conventional valves of this type. A bubble tight seal can be maintained at all times for closed position of the valve, and such a seal is possible without highly accurate machining of the parts, and irrespective of slight warpage or distortion of either the valve member or the body. Foreign material in the line fluid does not interfere with the establishment or maintenance of a bubble tight seal, because of the wiping action of the O-ring on the associated valve working surface and because of the ability of the O-ring to seal over foreign particles.

Ordinarily the O-ring will give long useful service without requiring replacement. However, when a ring becomes worn or broken it is a relatively simple matter to replace it, and after such replacement no careful adjustments are required to obtain the desired bubble tight seal. For certain services it may be desirable to use rings made of materials like nylon or Teflon, which is somewhat harder than rubbers usually employed in the manufacture of O-rings.

I claim:

1. In a valve of the butterfly type, a valve body member having a passage therethrough and a circular valve seat embracing the passage, a disc-like valve member within the body, shaft means for mounting the valve member for turning movement of the same between closed and full open positions, the valve member in closed position having its outer periphery in juxtaposition with said seat and in full open position being positioned with its general plane parallel to the axis of the seat, a resilient sealing ring of the O-ring type, a continuous groove or recess formed in one of said members and serving to accommodate said seal ring, said seal ring when viewed in section being deformed radially between the body and the valve member for closed position of the valve, thereby establishing a fluid tight seal between its inner and outer peripheral surfaces and the cooperating surfaces of said members, the opposite side faces of the groove being defined by portions extended to provide annular lips which are spaced to form an annular gap through which the O-ring contacts the other member, the width of the gap being substantially less than the thickness of the O-ring whereby said lips serve to retain the O-ring within the groove or recess, one of said members being provided with a plurality of circumferentially spaced grooves serving to permit flow therethrough past the O-ring when the disc is moved to a position intermediate open and closed positions, said last named grooves interrupting annular peripheral surfaces of said one member that are located adjacent the sides of the O-ring for closed position of the valve.

2. In a valve of the butterfly type, a valve body member having a passage therethrough and a circular valve seat embracing the passage, a disc-like valve member within the body, shaft means for mounting the valve member for turning movements of the same between closed and full open positions, the valve member in closed position having its outer periphery in juxtaposition with said seat and in full open position being positioned with its general plane parallel to the axis of the seat, a resilient sealing ring of the O-ring type, a continuous groove or recess formed in one of said members and serving to accommodate said seal ring, said seal ring when viewed in section being deformed radially between the body and the valve member for closed position of the valve, thereby establishing a fluid tight seal between its inner and outer peripheral surfaces and the cooperating surfaces of said members, the opposite side faces of the groove being defined by portions extended to provide annular lips which are spaced to form an annular gap through which the O-ring contacts the other member, the width of the gap being substantially less than the thickness of the O-ring whereby said lips serve to retain the O-ring within the groove or recess, and check valve means serving to effect control of pressure transmitting communication between the two bottom corners of the groove and the corresponding sides of the valve member, said check valve means permitting pressure in the groove to be relieved to the corresponding spaces on the sides of the valve member without permitting pressure equalization in the opposite direction.

3. A valve as in claim 2 in which said check valve means in each instance includes a resilient ring of the O-ring type.

4. A valve as in claim 1 in which said grooves are formed in the body and extend in opposite directions from an annular area engaged by the resilient O-ring for closed position of the valve.

5. A valve as in claim 1 in which said grooves are formed in the periphery of the valve member and extend in opposite directions from an annular area of said periphery engaged by the resilient O-ring for closed position of the valve.

References Cited in the file of this patent
UNITED STATES PATENTS

| | | |
|---|---|---|
| 1,671,069 | De Wein | May 22, 1928 |
| 2,058,996 | Kollberg | Oct. 27, 1936 |
| 2,254,209 | Buttner | Sept. 2, 1941 |
| 2,385,510 | Harwood | Sept. 25, 1945 |
| 2,417,494 | Hoof | Mar. 18, 1947 |
| 2,427,789 | Kehle | Sept. 23, 1947 |
| 2,574,851 | Wagner | Nov. 13, 1951 |
| 2,614,793 | Storm | Oct. 21, 1952 |
| 2,621,885 | Schmitt | Dec. 16, 1952 |
| 2,657,896 | Muller | Nov. 3, 1953 |
| 2,754,846 | Ray | July 17, 1956 |
| 2,747,611 | Hewitt | May 29, 1956 |

FOREIGN PATENTS

| | | |
|---|---|---|
| 11,477 | Great Britain | of 1886 |